(12) United States Patent
Augst

(10) Patent No.: US 10,611,297 B2
(45) Date of Patent: Apr. 7, 2020

(54) METHOD FOR DIRECTION DEPENDENT SIGNALING

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 99 days.

(21) Appl. No.: 14/692,885

(22) Filed: Apr. 22, 2015

(65) Prior Publication Data

US 2015/0224920 A1 Aug. 13, 2015

Related U.S. Application Data

(63) Continuation of application No. PCT/EP2013/071678, filed on Oct. 17, 2013.

(30) Foreign Application Priority Data

Oct. 25, 2012 (DE) .......................... 10 2012 219 573

(51) Int. Cl.
*B60Q 1/26* (2006.01)
*G09F 19/18* (2006.01)
*G09F 19/14* (2006.01)
*G09F 21/04* (2006.01)
*B60Q 1/50* (2006.01)

(52) U.S. Cl.
CPC ............. *B60Q 1/2619* (2013.01); *B60Q 1/50* (2013.01); *G09F 19/14* (2013.01); *G09F 19/18* (2013.01); *G09F 21/04* (2013.01)

(58) Field of Classification Search
CPC ......... B60Q 1/2619; B60Q 1/50; G09F 19/14; G09F 19/18; G09F 21/04
USPC ........................................................ 340/468
See application file for complete search history.

(56) References Cited

U.S. PATENT DOCUMENTS 6,133,851 A * 10/2000 Johnson .................. B60Q 1/30
  340/431
6,952,994 B2 * 10/2005 Dunn ...................... B41M 1/04
  101/483

(Continued)

FOREIGN PATENT DOCUMENTS

DE  10 2006 050 546 A1  4/2008
DE  10 2006 050 548 A1  4/2008

(Continued)

OTHER PUBLICATIONS

International Search Report (PCT/ISA/210) dated Dec. 16, 2013, with English translation (four (4) pages).

(Continued)

*Primary Examiner* — Steven Lim
*Assistant Examiner* — Mancil Littlejohn, Jr.
(74) *Attorney, Agent, or Firm* — Crowell & Moring LLP

(57) ABSTRACT

A method is provided for direction-dependent signaling particularly by a vehicle, including: display of two or more graphical messages from the same vehicle region to the outside; wherein each graphical message has an associated spatial angle from which only the respective graphical message is visible, but not the other graphical message(s). The spatial angles differ at least in an angle parameter.

19 Claims, 4 Drawing Sheets

(56) References Cited

U.S. PATENT DOCUMENTS

| | | | |
|---|---|---|---|
| 7,020,992 B1* | 4/2006 | Christie | G09F 21/04 |
| | | | 40/593 |
| 2001/0026249 A1 | 10/2001 | Bell et al. | |
| 2003/0025597 A1* | 2/2003 | Schofield | B60Q 1/346 |
| | | | 340/435 |
| 2005/0251461 A1* | 11/2005 | Nykamp | G06Q 30/0603 |
| | | | 705/26.41 |
| 2006/0055678 A1* | 3/2006 | Kleihorst | G02B 27/06 |
| | | | 345/173 |
| 2012/0062372 A1 | 3/2012 | Augst | |

FOREIGN PATENT DOCUMENTS

| | | | | |
|---|---|---|---|---|
| DE | 10 2009 020 328 A1 | 11/2010 | | |
| FR | 2 949 725 A1 | 3/2011 | | |
| WO | WO 03/049072 A1 | 6/2003 | | |
| WO | WO 2009/062796 A2 | 5/2009 | | |
| WO | WO 2011/090417 A1 | 7/2011 | | |
| WO | WO 2011090417 A1 * | 7/2011 | | B60Q 1/525 |
| WO | WO-2011090417 A1 * | 7/2011 | | B60Q 1/525 |
| WO | WO 2013/012360 A1 | 1/2013 | | |

OTHER PUBLICATIONS

German Search Report dated Sep. 27, 2013, with partial English translation (ten (10) pages).

\* cited by examiner

METHOD FOR DIRECTION DEPENDENT SIGNALING

CROSS REFERENCE TO RELATED APPLICATIONS

This application is a continuation of PCT International Application No. PCT/EP2013/071678, filed Oct. 17, 2013, which claims priority under 35 U.S.C. § 119 from German Patent Application No. 10 2012 219 573.4, filed Oct. 25, 2012, the entire disclosures of which are herein expressly incorporated by reference.

This application contains subject matter related to U.S. application Ser. No. 14/693,353, entitled "Method for Direction-Adaptive Signaling" filed on Apr. 22, 2015.

BACKGROUND AND SUMMARY OF THE INVENTION

The invention relates to a method for direction-dependent signaling, particularly by a vehicle, and to an apparatus for the same purpose.

Today, the opportunities for visual communication among road users on the basis of technical tools are limited. Such technical tools essentially include the use of turn signals and the high beam.

Occasionally, special vehicles or emergency vehicles have ordinary display panels that are able to present short texts or signs such as "please follow".

The problem address herein is to improve the technical tools that can be used to transmit messages to other road users.

The problem is solved by a method for direction-dependent signaling particularly by a vehicle, as well as and an apparatus for the same purpose, according to the invention.

In one aspect, a method for direction-dependent signaling particularly by a vehicle includes: display of two or more graphical messages from the same vehicle region to the outside; wherein each graphical message has a spatial angle that exists for it from which only the respective graphical message is visible, but not the other graphical message(s); wherein the spatial angles of the graphical messages differ at least in an angle parameter.

In this way, another road user (other drivers, pedestrians, cyclists) can see messages intended specifically for him (vehicle signals, symbols) when looking at the vehicle. Each road user can have a graphical message displayed to him that is tailored to him, without the possibility of his being able to perceive other graphical messages. The result is very much fewer misunderstandings, and less overexcitement for unconcerned road users as a result of information that is not relevant to them. Even in the case of automatically prompted full braking, for example, it is thus possible for the vehicle to display a signal in timely fashion specifically in the direction of further vehicles in order to minimize possible consequences of this action. No side effects arise for other road users. The further road users are not distracted by graphical messages that are not intended for them and are also not liable to interpret a graphical message incorrectly, since they do not see it. The method can be performed as an alternative or in addition to the legally required display means such as lamps or turn signals. In particular, at least one graphical message is visible from the outside when looking at the vehicle surface, particularly a region of the vehicle that is nontransparent per se, directly.

Different graphical messages are displayed for different directions. The main advantage in this case is that road users who are in particular directions in relation to the vehicle, e.g. in the blind spot region, in the same lane, in other lanes, on a driveway, etc., have a graphical message that is appropriate to their position displayed for them. This makes it possible to avoid disturbing or irritating further road users who are not affected by a warning or information item or who are intended to be provided with another information item.

It is additionally advantageous that each graphical message can benefit from the full size of the display displaying it. The method allows intuitive communication with other road users. Selectivity of the direction means that the method is advantageous in terms of energy, e.g. in comparison with other lights and signaling apparatuses. This improves the $CO_2$ balance and is environmentally friendly.

FIG. 1 schematically shows a vehicle 1 having a display 2 that is set up to display a first message such that another, first road user, whose perspective 1 is on the display 2, can perceive the first message. At the same time, the display 2 is likewise set up to display a second message such that another, second road user, whose perspective 2 is on the display, can perceive the second message. However, the display of the first message is such that the second road user cannot perceive it. Similarly, the first road user cannot perceive the second graphical message.

The spatial angles are determined by means of the following angle parameters, in particular for example:
a) limiting angle clockwise $\varphi_1$,
b) limiting angle counterclockwise $\varphi_2$,
c) limiting angle upward $\Theta_1$,
d) limiting angle downward $\Theta_2$.

Alternatively, these can also be determined or described for example by means of a central angle, which denotes the orientation of an angle range, and/or an aperture angle that denotes the extent of the spatial angle, particularly a vertical, horizontal or radial aperture angle. The angles can be understood in a polar or spherical coordinate system, the coordinate origin being able to be particularly in the vehicle region or in the interior of the vehicle behind the vehicle region or starting from the region delimited by the vehicle surface.

At least one, two or more spatial angles can have at least partially overlapping geometric regions. Differences can cover particularly an angular deviation of at least 5°, 10°, 15°, 30°, 45°, 60°, 90°, 120°, particularly in the horizontal direction, and/or can cover 3°, 5°, 10°, 30° in the vertical direction.

A vehicle region is understood to mean, in particular, a straight or curved surface of the vehicle and/or a region of the vehicle. The vehicle region is situated on one side of the vehicle (e.g. rear, side, corner, curvature) and is oriented essentially in one direction, particularly such that the resulting curvature of the surface within the vehicle region covers no more than 6°, 10°, 14°, 25°. The vehicle surface may be embodied as a design element or functional element of the vehicle or can contain such elements.

A vehicle region may be a rear section, hood, lamp, side door, windshield, pillar, wheel cap on a vehicle or may be fitted in the region of these portions.

The graphical messages may differ from one another. A vehicle that is in the blind spot, for example, has the graphical message displayed in the form of a specific information item that it can now be seen less well, while the vehicles traveling directly behind have the graphical message displayed that the vehicle will change lane in 100 meters even before the driver has "officially and obligatorily" indicated. This is possible simultaneously and by means of the same display apparatus. The various graphical messages are not only to have quantitative differences, such as more intense lighting or a different color or a different color profile, for example, they can also essentially differ in terms of content. In particular, they may also contain different numerical information, e.g. distance information.

It is also contemplated for an essentially similar or the same graphical message to be displayed in at least two directions, said message nevertheless differing in its content and/or in the period in which it is presented, in the chronological order or sequence (when there are a plurality of graphical messages for the same direction).

In a special variant for direction-dependent signaling, a first graphical message is displayed from a vehicle region to the outside such that it is visible completely only from a first spatial angle, and a second graphical message is displayed from the same vehicle region to the outside such that it is visible completely only from a second spatial angle, and a third graphical message is displayed from the same vehicle region to the outside such that it is visible completely only from a third spatial angle, the first, second and third spatial angles each differing from one another.

In one development, at least two graphical messages differ at least to some extent in their content or in the period in which they are displayed. The content of at least one graphical message can be continually redetermined, particularly on the basis of predetermined criteria.

At least one graphical message may also be compiled from a sequence of graphical messages, the order of graphical messages in a sequence illustrating logical, causal and/or spatial relationships, for example, particularly in relation to the current traffic situation or arrangement of objects.

The graphical messages may also have quantitative differences (such as luminosity). The sizes of at least two graphical messages and/or the proportions between individual portions of at least two graphical messages that are displayed in different directions may be different.

In another development, at least two graphical messages differ from one another in the size in which they are displayed, in proportions and/or in the proportions of component parts of the graphical messages.

Hence, other road users who are looking at the vehicle from their respective direction can see messages that are matched to them geometrically and/or in relation to proportions of the component parts of the graphics. By way of example, a text or symbol message may be presented for a vehicle in the adjacent lane in a subjectively seen size of approximately 40 cm. A message for a vehicle traveling behind at a distance of 50 meters can—even if this should be the same message—have its content compressed to the essential and at the same time be presented so that at least individual elements are larger, e.g. subjectively 70 cm, so that they can still be perceived well enough even from a distance.

In another development, it is possible for one or more graphical messages to include a symbol, text, a contour (particularly an object contour), or one or more area(s) filled with one or more textures.

In another development, at least one or two graphical messages is/are created on the basis of a map of the surroundings that is captured using means in the vehicle; and/or at least one or two graphical messages is/are created on the basis of an image sequence that is recorded from the surroundings of the vehicle, wherein at least one image sequence or map of the surroundings is conditioned using image processing devices.

The graphical message may also be embodied as a video from the surroundings. To allow better perceptibility by road users, this is an image sequence conditioned in a special manner using means in the vehicle. Advantageously, the edges from the image sequence that is captured using a vehicle camera or another vehicle sensor are boosted and/or traced by use of inherently known methods, the contrasts are increased in the image sequence, and at least some of the image areas are filled with artificially produced textures.

Hence, the image sequence is easily visible even under rather unfavorable light conditions. The image sequence can also be abstracted and/or at least partially replaced by symbols and/or enriched with information from the navigation system of the vehicle. It is also advantageous to present a detail from a navigation map or portions thereof that relate to the current surroundings and/or the surroundings of the vehicle route that will be taken in the near future. Hence, the road user coming from a particular direction knows, by way of example, which exit on a roundabout the vehicle will take, etc. Advantageously, the graphical message may also contain the brand emblem, the trademark and/or portions of the corporate identity. This provides very memorable advertising and image enhancement.

In a development, the display is carried out using a display that includes microprisms, microlenses or lenticular optical components.

An extremely simple and sufficiently effective implementation of the display consists in the use of TFT display technology together with a lenticular technology (flip image technology). This may be a prismatic or cylindrical optical film, for example, that steers the mapping of particular pixels in a different direction than the mapping of other particular pixels of the display. The actuation of particular pixels of the display can produce mapping for a predetermined direction (this is compiled from the pixel lights deflected in this direction), so that said mapping is perceived by different road users as essentially coherent graphics.

Two or more graphical messages can also be displayed with interruptions over time, in particular alternately, e.g. by turns, in succession.

Advantageously, the two or more messages are produced at least to some extent by way of the same pixels or illuminants in this case. These are actuated for the one or other graphical message according to the order of the presentation.

In this case, the time intervals can be chosen such that the observer does not notice the rapid switching on and off of at least one graphical message. By way of example, it is thus possible for two observers from two directions each to see the graphical messages that are intended for them displayed constantly. This is comparable to the effect of video sequences, for example, which consist of frames or illumination of particular screen regions that are perceived by the observer as coherent rather than flashing, for example.

Such a display apparatus may be fitted in a portion of the vehicle surface or visibly or so as to shine through beneath the vehicle surface, for example. Alternatively, the display apparatus may be embodied as a projection (e.g. in a similar manner to a projector) that is fitted particularly behind a prismatic and/or cylindrical optical layer. The principle of presentation and direction dependence may be as described above in this case. What is particularly advantageous is an embodiment in which the surface of the vehicle, which surface has the display apparatus fitted behind it, appears as an opaque surface from a particular direction when a graphical message is not currently being presented in that direction.

The graphical messages can be produced particularly by means of direction-dependent transmission of a particular quantity of light, the latter having different light levels in many different directions, so that they are enough to provide the observer with an impression of a graphical message that is at the corresponding spatial angle. The optical properties of the beams that form a graphical message, e.g. in at least 500, 1000, 5000 different directions, assume different values at the same time or in a very short interval of time within the spatial angle.

The power, particularly the light output that the display apparatus transmits, may be below 100, 200, 400, 800 lm (lumens) on average during operation. This power alone may be sufficient to communicate the required information to other road users by way of graphical messages. This means that a very much lower power and low energy consumption is required than in the case of apparatuses that use selective illumination of the surroundings or signaling by way of illumination of surrounding objects, for example.

Alternatively or additionally, other technologies, particularly laser technologies, can be used in the display apparatus for producing graphical messages. By way of example, these can produce a pattern that is visible only from one direction, for example using the interference properties of coherent laser light and/or by using a mask that renders particular portions of the light shone in visible only from particular directions.

Alternatively or additionally, the method can be effected by means of, in particular locally different, influencing of light absorption or light refraction properties.

The method may be embodied such that at least two graphical messages are produced by the influencing of light absorption or light diffraction properties. By way of example, the method may be embodied as a combination of an optical apparatus that influences the beam path on a location or angle specific basis and one or more elements that have light absorption properties, light reflection properties. In this case, the influencing of the light absorption properties, light reflection properties and/or interference properties may have local dependence on location. The graphical message that is displayed at a spatial angle forms as a pattern of light reflected to different extents and/or of light absorbed to different extents. This can involve particularly the light that comes essentially from the corresponding spatial angle. In other words: it may also be the light from the lamps of another road user to whom the graphical message is displayed. The light source of the other road user provides the light that is required for the display, this being achieved by reflection, in particular. Alternatively, it is possible to use other technologies, particularly laser technologies.

In another development, at least two graphical messages appear at the same position in space, which position does not coincide with the vehicle surface, in particular.

In a further development, at least one spatial angle alters, particularly while the method is being carried out, at least in an angle parameter, particularly on the basis of the determination of the angle parameters using means in the vehicle.

At least one spatial angle, particularly at least one angle parameter of the spatial angle, and/or the distance from which the graphical message is visible can be changed with or without interrupting the performance of the method. The alteration of the at least one angle parameter of the at least one spatial angle may be embodied in continuous form, particularly in almost continuous form using angle steps of less than 5° or less than 10°, or in discrete form, e.g. by two or three steps, e.g. greater than 20°.

This means that in surroundings and/or a traffic situation, it is possible to see one graphical message, e.g. at a spatial angle of −20° to −35° relative to the longitudinal axis, but another graphical message can be seen only at a spatial angle of −10° to +10° relative to the longitudinal axis of the vehicle. When the traffic situation changes, the angles and/or other display parameters described above also change. This is true for each of the graphical messages (when required also independently of one another). The term "using means in the vehicle" also covers reception of a Car2X information item by the vehicle and consideration of this information item when ascertaining the angles or parts of space to which the different graphical messages are sent.

Of particular advantage in this context is an embodiment in which means in the vehicle are additionally used to determine the directions or parts of space in which these at least two graphical messages are displayed.

In one development, at least one graphical message contains an information item, particularly presented as an image sequence, that contains at least: a call for action for the first or second road user, a prior announcement of an action of its own or of a possible intention and/or an information notification for the first or second road user.

The content of the graphical messages may be as follows, for example: invitation to change lane; prior announcements about the intention of the vehicle; speed indications; special warning sign with explanation of the reason for warning; notification of a conspicuous feature of the neighboring vehicle e.g. text "lights?"; this allows e.g. a piece of information "Baby on board" to appear through an otherwise darkened surface only if, and only in a particular direction, another vehicle is approaching or overtaking too quickly from this direction.

The method can also be applied even when the vehicle is at a standstill and the data bus is asleep. By way of example, salutations can be output in the direction of the radio key during locking/opening. A parked vehicle is also better protected against possible jostling, e.g. when it shows a parked sign or another situation-dependent graphical message in the direction from which the vehicles are coming.

In another development, at least one graphical message is displayed to the outside, said message being visible essentially only from a predetermined spatial angle, characterized in that the spatial angle is changed in at least one angle parameter on the basis of the predetermined criteria.

In another development, the content and/or the time sequence of a graphical message is dependent on the automatically ascertained visibility of a road user for the driver of the vehicle, the visibility being ascertained by taking into account one of the following parameters: setting of mirror positions and/or of the camera systems in the vehicle; at least partial concealment of the road user, particularly behind the pillars of the vehicle and/or behind further objects in the surroundings of the vehicle.

In another development, the display of the at least one graphical message, in relation to the spatial angle and/or content of the graphical message, is dependent on the driver state captured using means in the vehicle and/or on a driver alertness and/or driver perspective. A vehicle that is in the blind spot, for example, receives the graphical message more or less early or late, more or less intensively, depending on whether its own driver has already looked into the relevant mirror.

In a variant, at least one graphical message is, in particular per se, displayed in three dimensions at least from one spatial angle. This is particularly advantageous when displaying complex traffic situations, spatial relationships or information that is illustrated by way of spatial relationships.

In another development, at least two spatial angles are denoted by angle parameters that are so far apart that a human being cannot simultaneously see both of the graphical messages displayed at this spatial angle at a distance of 2 m from the vehicle without aids.

In another development, the graphical message displayed at least at one spatial angle is visible only at a particular range of distance that is indicated at least from one direction.

Hence, the graphical message is depicted sharply only at a particular range of distance of/up to e.g. 10 meters, 20 meters, 50 meters from the vehicle. In other ranges of distance, the graphical message can appear only in a substantially reduced form, for example. In particular, a graphical message can contain a structure of high and low spatial frequencies such that it is perceived as substantially different graphical messages according to the observation distance. A similar effect on the observer is known in a completely different context, e.g. from some paintings by Salvador Dali. These reveal different content depending on the observation distance.

Advantageously, this can be achieved with means of refraction, particularly of focusing. The loss of sharpness means that this is no longer visible to the full extent outside these ranges and hence the graphics lose or alter at least a substantial portion of the information.

There may be provision for interaction with a user, particularly the driver of a vehicle. This interaction may also be in a form such that the direction in which a graphical message is intended to be displayed can be chosen by the user, particularly from an automatically generated preselection. In a development of this method, the user can even select individual road users for whom the advice is intended to be displayed. This can be accomplished by use of a screen, for example, that presents at least schematically depicted vehicle surroundings and/or a vehicle, so that the user can use a rotary knob, can use the touch screen function of the screen or can use gesture control, for example, to select one or more graphical messages to be displayed that need to be displayed particularly in one particular direction relative to the ego vehicle or explicitly in the direction of a particular lane or a particular road user.

In another aspect, an apparatus for direction-dependent signaling, particularly by a vehicle, includes: a display that is set up to display two or more graphical messages from the same vehicle region to the outside; wherein each graphical message has a spatial angle existing for it from which only the respective graphical message is visible, but not the other graphical message(s); wherein the spatial angles of the graphical messages differ at least in an angle parameter. The application of the method to a motor vehicle is also advantageous because modern motor vehicles have the necessary infrastructure for implementing the method and the economic benefit of the variant embodiments described here in road traffic is particularly great.

Another aspect also includes a computation unit for carrying out one of the methods discussed above and also the vehicle in which the relevant method is carried out. It is also possible for a computer program, a computer program product having a data storage medium with program code and/or an executable program to be provided that is designed to perform the method described when the program code or the executable program is executed on a computation unit of appropriate design. The disclosure likewise relates to a product that is fitted into the vehicle, or mounted on the vehicle, retrospectively and particularly uses the vehicle infrastructure (power supply, data, signals) and is set up to carry out one of the methods described above.

In an advantageous refinement of the method, the display apparatus is mounted on the clothing of a motorcyclist or is designed as part of this clothing. The presentation of the graphical messages also takes account of the relative position of the motorcyclist on the vehicle. Hence, optimum operation can be achieved for the above methods and apparatuses even in the event of movements by the motorcyclist on his vehicle that are captured by sensor.

Other objects, advantages and novel features of the present invention will become apparent from the following detailed description of one or more preferred embodiments when considered in conjunction with the accompanying drawings.

BRIEF DESCRIPTION OF THE DRAWINGS

The same reference symbols denote corresponding elements throughout the figures.

DETAILED DESCRIPTION OF THE DRAWINGS

Figure 1:
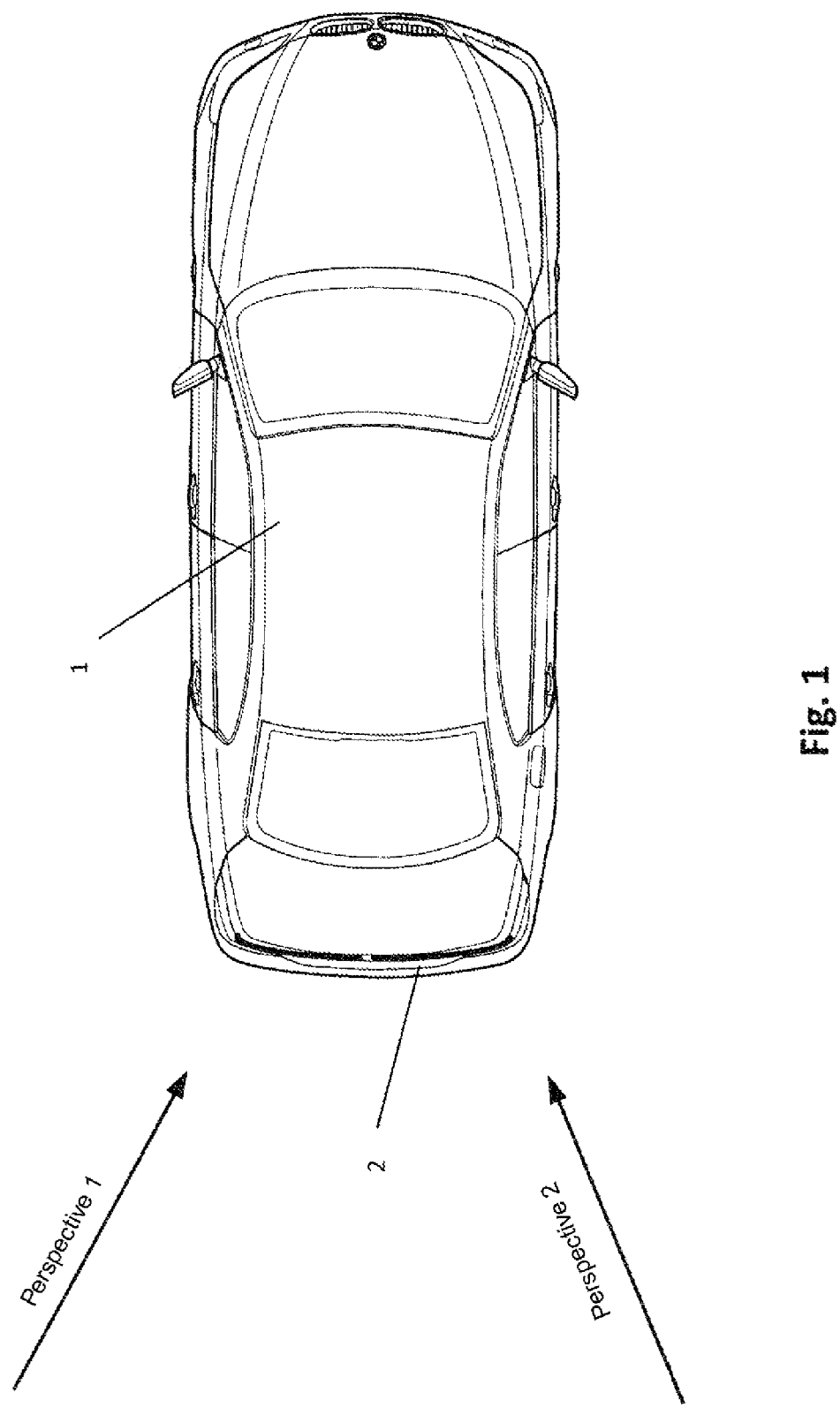
FIG. 1 schematically shows a vehicle with a display according to an exemplary embodiment for two perspectives.
Figure 2:
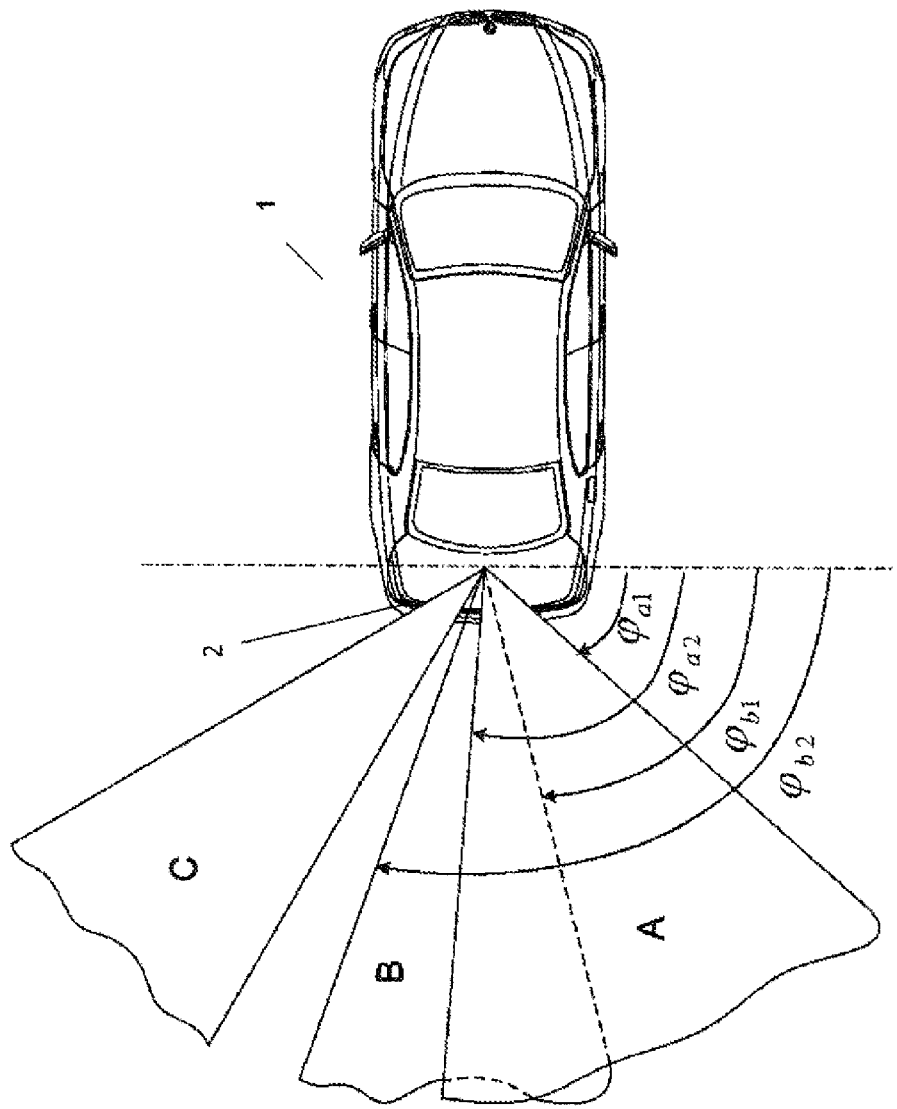
FIG. 2 schematically shows the vehicle with the display according to the exemplary embodiment for three perspectives.

FIG. 2 schematically shows the vehicle 1, whose display 2 arranged at the rear is configured to display three graphical messages. A first graphical message is displayed for perspectives at the spatial angle from $\varphi a1$ to $\varphi a2$. The range of perspectives from which the first graphical message is visible is denoted by "A" in FIG. 2. A second graphical message is displayed for perspectives at the spatial angle from $\varphi b1$ to $\varphi b2$. The range of perspectives from which the second graphical message is visible is denoted by "B" in FIG. 2. A similar situation applies to a third graphical message, which is visible in the range of perspectives that is denoted by "C" in FIG. 2. As can be seen from FIG. 2, the ranges "A" and "B" intersect, which means that for perspectives at the intersection both the first and the second graphical message are visible. The spatial angles are measured from the plane that is vertical with respect to the longitudinal axis, the section of said plane being shown in dashes in FIG. 2.

In this embodiment of the method for direction-dependent signaling, a first graphical message is displayed to the outside from a vehicle region such that it is visible completely only from a first spatial angle and a second graphical message is displayed to the outside from the same vehicle region such that it is visible completely only from a second spatial angle and a third graphical message is displayed to the outside from the same vehicle region such that it is visible completely only from a third spatial angle, the first, second and third spatial angles each differing from one another.

Figure 3:
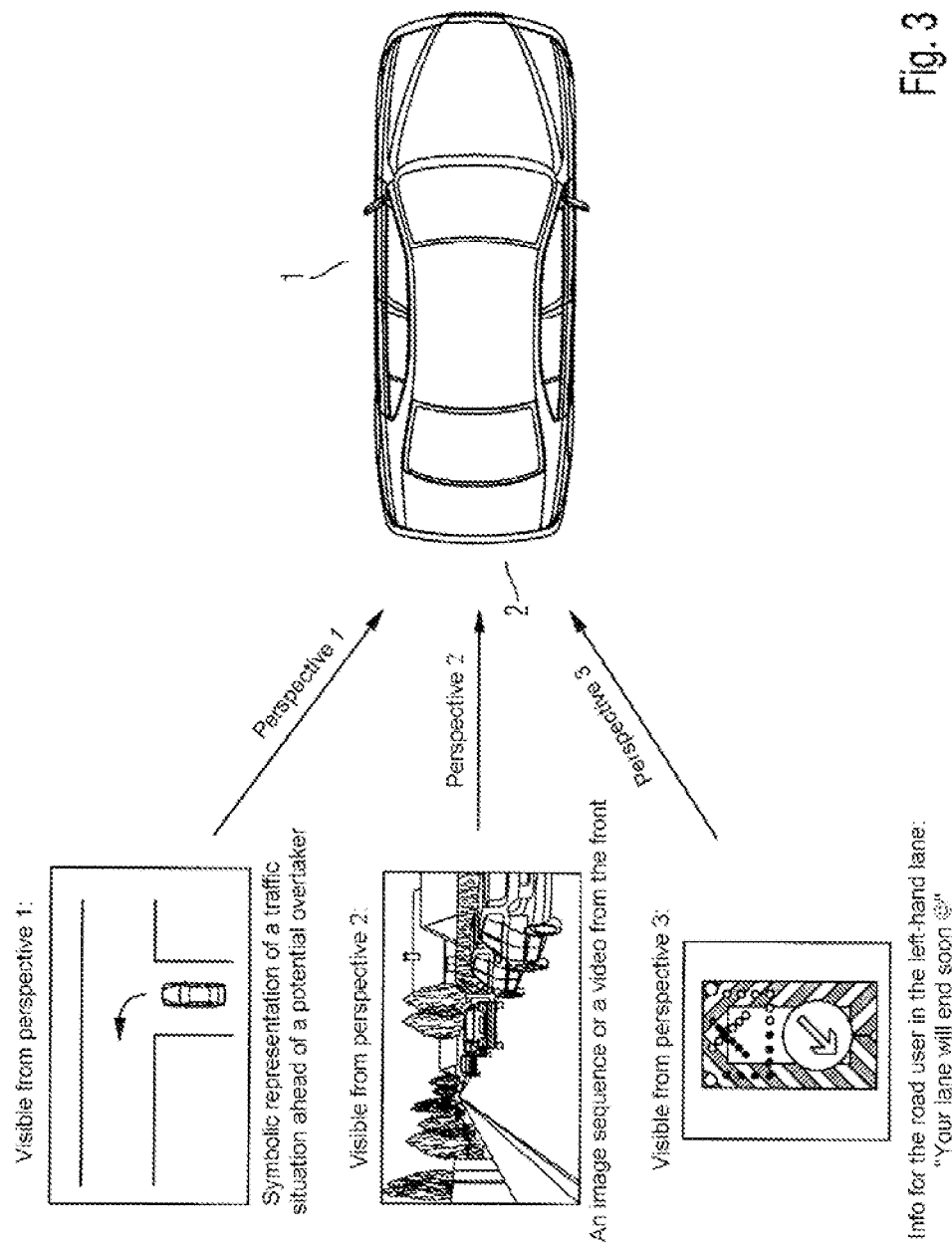
FIG. 3 schematically shows a vehicle with a display according to the exemplary embodiment for three perspectives.

FIG. 3 shows a schematic view of the vehicle 1 with exemplary views from three perspectives. The first perspective ("perspective 1") is in the range "C" from the perspective ranges shown in FIG. 2. The second perspective ("perspective 2") is in the range "B" from the perspective ranges shown in FIG. 2. The third perspective ("perspective 3") is in the range "A" from the perspective ranges shown in FIG. 2. Neither perspective 2 nor perspective 3 are in the region of overlap of "A" and "B". Hence, other road users that are in perspective 2 and perspective 3 can see only the graphical messages displayed in their respective perspective.

A road user who is in perspective 1 can see the schematic presentation of the traffic situation and the intention of the vehicle 2 on the display 2. To this end, the vehicle 1 conditions data from the ambient sensor system and the navigation system such that a schematic presentation is obtained. The presentation of the situation as a scheme allows the other road user to apprehend quickly. The association of the presentation of the traffic situation with perspective 1, that is to say seen diagonally left to the rear from the vehicle 1, takes into account that there are typically other road users in this position who would like to overtake the vehicle 2. Presentation of the intention of the vehicle 1 and of the surroundings is of benefit to precisely these road users. In the present example, it is indicated that the vehicle 1 will turn off left, which would mean that there is the danger of a collision with the overtaking road user. The display of a schematic overview in perspective 1 helps to avoid an accident.

In perspective 2, a video of the view in front of the vehicle 2 is shown. This can be modified to allow faster perception or better presentation on the display 2. Edges can be highlighted and textures can be replaced by standard textures. Specifically for a road user following the vehicle 2, the view of the road and anterior surroundings in front of the vehicle 2 is useful. This is because the vehicle 2 is blocking the view of the anterior surroundings for road users behind. Knowledge of the anterior surroundings of the vehicle 2 allows more anticipatory driving and may provide the motivation to keep more distance from the vehicle 2.

From perspective 3, it is possible to see a typical road sign that indicates the end of the lane. The situation that the lane to the right of the vehicle 1 is coming to an end can be identified from the ambient sensor system and possibly Car2Infrastructure communication. This representation of the road sign is displayed to road users traveling diagonally to the right behind the vehicle 1. This concerns the information that the lane to the right of the vehicle is ending, in particular.

Figure 4:
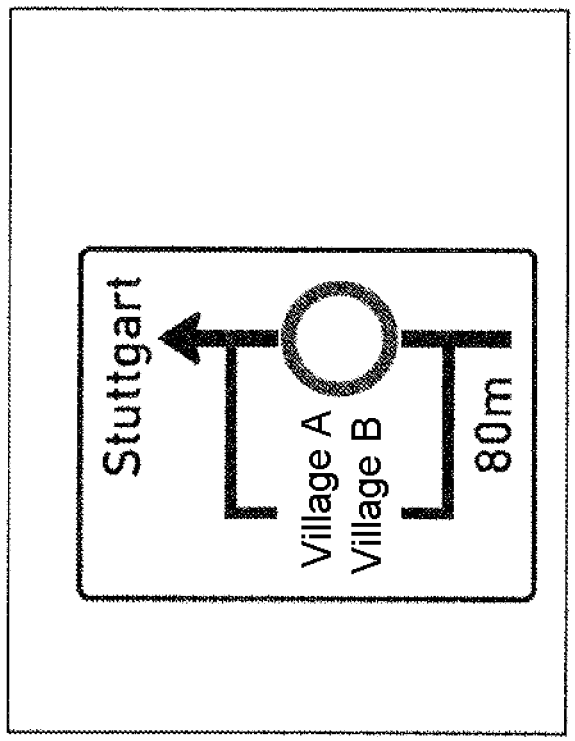
FIG. 4 schematically shows a presentation in a perspective according to a further exemplary embodiment.

FIG. 4 shows a conditioned presentation of road signs that are captured by the vehicle as an orientation aid for a road user behind the vehicle 2. This is useful particularly when the road signs are concealed from the road user behind. The presentation shown in FIG. 4 can be displayed in a first, second or third perspective, for example.

The graphical messages can be presented three-dimensionally per se. From the perspective of the observer, they can at least to some extent appear as being inside or outside the physical vehicle surface.

An advantage of a graphical message that is at least to some extent outside the vehicle surface in the perception of the observer is also that:
the perceived dimensions of the vehicle appear larger in one or more directions when a graphical message is represented, without the vehicle needing to be of such a physical size. This also decreases the safety distance perceived by the observer, particularly when a graphical message is presented such that the observer will brake earlier or take better evasive action, for example, and has a higher probability of avoiding a collision with the vehicle.

An advantage of a graphical message that is at least to some extent inside the vehicle surface in the perception of the observer is also that:
there is a better design option for presenting a difference in the perceived depth for presenting the information;
there is a better design option for presenting various forms and/or the design of the graphical message as such.

In the case of a graphical message that is perceived inherently in three dimensions, one portion of the display can appear inside the physical surface and another portion can appear outside the physical surface of the vehicle. When an inherently two-dimensional graphical message, but one that is arranged in three dimensions, is presented, there is the possibility of presenting said message at an optimum angle in relation to the perspective. This variant can also be implemented with little complexity.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for direction-dependent signaling by a vehicle, the method comprising the acts of:
displaying a first graphical message via a display that includes a vehicle region, the display deflecting light from actively illuminated pixel elements forming the first graphical message such that the first graphical message is visible only from within an associated first spatial angle;
displaying a second graphical message via the display, the display deflecting light from actively illuminated pixel elements forming the second graphical message such that the second graphical message is visible only from within an associated second spatial angle, the second spatial angle being different from the first spatial angle,
wherein the first spatial angle and/or the second spatial angle includes an area significantly removed from a blind spot of the vehicle; and
changing the first spatial angle and/or the second spatial angle in response to receiving a user selection of the change via a schematic depiction of the vehicle and spatial angles on a screen in the vehicle, while the respective image is displayed as visible only within the associated spatial angle.

2. The method according to claim 1, wherein the first and second graphical messages differ in one or more of: content and a period in which they are displayed.

3. The method according to claim 1, wherein the first and second graphical messages differ in one or more: of a size in which they are displayed, proportions, and proportions of component parts of the graphical messages.

4. The method according to claim 1, wherein the first and second graphical messages comprises one or more of: a symbol, a text, an object contour, and an area filled with a texture.

5. The method according to claim 1, further comprising:
creating the first graphical message based on one or more of: a map of surroundings of the vehicle captured via a navigation system of the vehicle; and an image sequence recorded from surroundings of the vehicle, wherein the image sequence and/or the map is conditioned using image processing.

6. The method according to claim 1, wherein the acts of displaying are carried out via a display comprising microprisms, microlenses, or lenticular optical components.

7. The method according to claim 1, wherein the acts of displaying comprise local alteration of reflection properties, absorption properties, or interference properties of incident light from a direction of respective first and second spatial angles.

8. The method according to claim 1, wherein the first and second graphical messages appear at a same position in space, said same position in space not coinciding with a vehicle surface.

9. The method according to claim 1, wherein the first graphical message and/or the second graphical message contains an information item represented as an image sequence containing:
- a call for action by a road user,
- a prior announcement of an action of the vehicle or an intent to act, and/or
- an information notification for the road user.

10. The method according to claim 1, wherein the first and second spatial angles are predetermined spatial angles that differ in at least one angle parameter based on predetermined criteria.

11. The method according to claim 1,
wherein the acts of displaying include displaying one or more of: content and a time sequence of the respective first and second graphical message dependent on an automatically ascertained visibility of a road user for a driver of the vehicle, and
wherein the visibility is determined by taking account one of the following parameters: setting of mirror positions or camera systems in the vehicle, and an at least partial concealment of the road user behind pillars of the vehicle or behind other objects in surroundings of the vehicle.

12. The method according to claim 1, wherein the first and second spatial angles are determined based on one or more of: a driver condition captured via sensors in the vehicle, a driver alertness, and a driver perspective.

13. The method according to claim 1, wherein the content of the first and second graphical messages are determined based on: a driver condition captured via sensors in the vehicle, a driver alertness, and a driver perspective.

14. The method according to claim 1, wherein at least one of the acts of displaying include displaying the respective first or second graphical message 3-dimensionally.

15. The method according to claim 1, wherein the first and second spatial angles are sufficiently distinct such that a human cannot simultaneously see both of the respectively displayed first and second graphical messages at a distance of two meters from the display.

16. The method according to claim 1, wherein the acts of displaying are such that the graphical messages are visible only at a particular distance range.

17. An apparatus for direction-dependent signaling by a vehicle, comprising:
a screen in the vehicle that is configured to schematically depict the vehicle and spatial angles;
a display configured to deflect light from actively illuminated pixel elements forming graphical messages so as to thereby:
display a first graphical message visible only from within an associated first spatial angle,
display a second graphical message visible only from within an associated second spatial angle, the second spatial angle being different from the first spatial angle, and
change the first spatial angle and/or the second spatial angle in response to receiving a user selection of the change via the schematic depiction on the screen, while the respective image is displayed as visible only within the associated spatial angle,
wherein the first spatial angle and/or the second spatial angle includes an area significantly removed from a blind spot of the vehicle.

18. The apparatus according to claim 17, further comprising:
an electronic processing unit configured to execute a program that causes the display to display the graphical messages as visible only from within the respective associated spatial angle.

19. A vehicle comprising an apparatus according to claim 18.

* * * * *